United States Patent
Raynal et al.

(10) Patent No.: US 8,646,758 B2
(45) Date of Patent: Feb. 11, 2014

(54) HIGH PERFORMANCE STRUCTURED PACKING FOR FLUID EXCHANGE COLUMN AND FABRICATION METHOD

(75) Inventors: Ludovic Raynal, Oullins (FR); Pascal Alix, Roussillon (FR)

(73) Assignee: IFP, Rueil Malmaison (FR)

( * ) Notice: Subject to any disclaimer, the term of this patent is extended or adjusted under 35 U.S.C. 154(b) by 562 days.

(21) Appl. No.: 12/530,528

(22) PCT Filed: Mar. 5, 2008

(86) PCT No.: PCT/FR2008/000291
§ 371 (c)(1),
(2), (4) Date: Mar. 5, 2010

(87) PCT Pub. No.: WO2008/132311
PCT Pub. Date: Nov. 6, 2008

(65) Prior Publication Data
US 2010/0213625 A1    Aug. 26, 2010

(30) Foreign Application Priority Data

Mar. 9, 2007    (FR) ..................................... 07 01770

(51) Int. Cl.
*B01F 3/04*    (2006.01)
(52) U.S. Cl.
USPC ................................ 261/112.2; 261/DIG. 72
(58) Field of Classification Search
USPC ........................................ 261/112.2, DIG. 72
See application file for complete search history.

(56) References Cited

U.S. PATENT DOCUMENTS

| | | | | |
|---|---|---|---|---|
| 3,158,527 A | * | 11/1964 | Faccin et al. | 428/181 |
| 3,652,066 A | * | 3/1972 | Faigle | 261/109 |
| 4,333,892 A | * | 6/1982 | Ellis et al. | 261/94 |
| 4,497,753 A | * | 2/1985 | Streiff | 261/95 |
| 4,575,435 A | * | 3/1986 | Kuhl | 261/94 |
| 4,576,763 A | * | 3/1986 | Nutter | 261/94 |
| 4,600,544 A | * | 7/1986 | Mix | 261/79.2 |
| 4,676,934 A | | 6/1987 | Seah | |

(Continued)

FOREIGN PATENT DOCUMENTS

DE    15 01 375 A1    1/1970
DE    154 153    3/1982

(Continued)

*Primary Examiner* — Charles Bushey
(74) *Attorney, Agent, or Firm* — Antonelli, Terry, Stout & Kraus, LLP.

(57) ABSTRACT

The invention is a method of formation and a structured packing for a fluid exchange column, which defines an exchange surface for at least one descending liquid phase to be placed in intimate contact with at least one ascending gaseous phase. The packing comprises a stack of plates having undulations, each plate being contained in a space included between two parallel planes L1 and L2 separated by a value of between 5 and 50 mm. The undulations are distributed on both sides of a center plane P separating the space into two equal parts and form a series of channels which extend along a direction D. The channels comprise wings contained in the space included between the two parallel planes. Each wing is composed of a strip B punched out in one of the channels according to at least two grooves C1 and C2. The width of the strip between the two grooves is between 1 and 15 mm. The strip B is stamped/embossed to create an orifice forming a discontinuity in the surface of the channel at the level of the two grooves C1 and C2.

22 Claims, 5 Drawing Sheets

(56) References Cited

U.S. PATENT DOCUMENTS

| | | | | |
|---|---|---|---|---|
| 4,710,326 A | * | 12/1987 | Seah | 261/112.2 |
| 5,063,000 A | | 11/1991 | Mix | |
| 5,407,607 A | * | 4/1995 | Mix | 261/112.2 |
| 5,578,254 A | * | 11/1996 | Mix | 261/112.2 |
| 5,629,258 A | | 5/1997 | Süess et al. | |
| 6,096,407 A | * | 8/2000 | Vodicka et al. | 428/175 |
| 6,276,045 B1 | | 8/2001 | Büchi et al. | |
| 6,299,999 B1 | | 10/2001 | Buchner et al. | |
| 6,409,378 B1 | * | 6/2002 | Kessler | 366/337 |
| 2005/0205467 A1 | * | 9/2005 | Hedrick et al. | 208/150 |
| 2007/0197382 A1 | | 8/2007 | West | |
| 2008/0036102 A1 | | 2/2008 | Thonneller | |
| 2008/0245651 A1 | | 10/2008 | Werlen et al. | |

FOREIGN PATENT DOCUMENTS

| | | |
|---|---|---|
| EP | 0 129 272 | 12/1984 |
| EP | 1 029 588 A1 | 8/2000 |
| FR | 2 086 365 | 12/1971 |
| FR | 2 867 697 A1 | 9/2005 |
| WO | WO 91/11178 | 2/1991 |
| WO | WO 98/10477 | 3/1998 |
| WO | WO 0024506 | 5/2000 |
| WO | WO 2005/119148 A | 12/2005 |
| WO | WO 2007/096666 A1 | 8/2007 |

* cited by examiner

HIGH PERFORMANCE STRUCTURED PACKING FOR FLUID EXCHANGE COLUMN AND FABRICATION METHOD

BACKGROUND OF THE INVENTION

The present invention relates to the field of equipment for transfer between fluids.

DESCRIPTION OF THE PRIOR ART

Contact columns provide the transfer of mass or heat between fluids. This type of equipment for contacting fluids is widely used to perform distillation, rectification, absorption, heat exchange, extraction, chemical reaction operations, etc.

Contact columns generally comprise a cylindrical enclosure equipped with internal contact elements promoting the transfer between fluids. In the column, the fluids can circulate in a co-current or a counter-current flow mode. In general, the column makes it possible to place in intimate contact an ascending gaseous phase with a descending liquid phase. The contact elements, which increase the contact surface between the fluids, can be trays or structured packings, that is, the elements provide the juxtaposition of a number of unified elements fit in an ordered fashion, for example, undulated sheets, or random packings, that is, random stacks of unitary elements, for example, rings, spirals.

Structured packings can be constructed of bent sheets arranged in an organized fashion in the form of large blocks as described in U.S. Pat. Nos. 3,679,537 and 4,296,050. New generation random packings general comprise metal elements provided with perforations and arched sections of sophisticated shapes.

Figure 1:
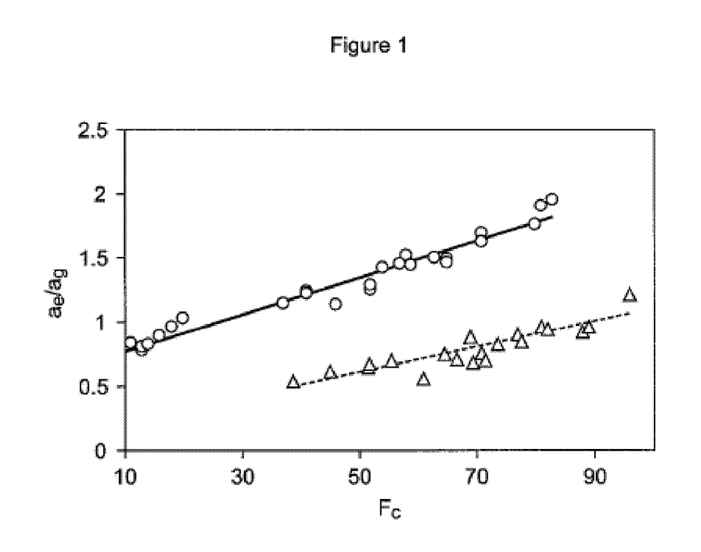
FIG. 1 shows a diagram comparing the properties of a structured packing and a random packing.

FIG. 1 shows the experimental results obtained for a $3^{rd}$ generation random packing and a structured packing. FIG. 1 represents the ratio between the effective area ae and the geometric area ag for a packing as a function of the flooding factor Fc. The effective area ae corresponds to the actual area available to realize the gas/liquid contact in the packing. The values of effective area are normalized by the geometric area of the packing ag, the geometric area corresponds to the total area developed by the packing. The flooding factor Fc is the ratio of the flow of gas circulating through the packing and the flow of gas corresponding to the flooding limit. Flooding corresponds to the operating limit of the contact column provided with a packing, that is, the maximum gas flow that can be passed through the column for a constant liquid flow in the case of a counter-current flow. It is seen that in the case of the random packing (values indicated by round symbols), the ratio ae/ag is very quickly greater than 1 and reaches values close to 2 when flooding is approached. This result, ae/ag>1, is explained by the fact that the physical support of the packing is not continuous. Thus, to pass from one element to the other, the liquid phase must separate and fragment into the form of droplets, which creates the supplemental exchange surface. Contrariwise, in the case of a structured packing (values indicated by triangular symbols), one observes that the ratio ae/ag almost never reaches the value 1. This result is explained by the fact that the flow of the liquid phase flows in the form of a liquid film which trickles throughout the packing without ever achieving full-wetting. The ratio ae/ag is therefore favorable to the use of random packings for a given geometric area. On the other hand, due to their geometric organization, structured packing develop specific surfaces, that is, the geometric surface of the packing available per unit volume, significantly higher than those of the random packings, for the same hydraulic capacity.

SUMMARY OF THE INVENTION

The present invention combines the advantages of structured packings which have a significant specific area and the advantages of the latest generation random packings which provide an efficient area which is useful to mass transfer far greater than their geometric area.

The invention is a structured packing constructed to have characteristics of random packings inducing in particular separation of liquid from the surface of the packing and allowing development of an effective area significantly greater than its geometric area.

In general, the invention comprises a structured packing of an exchange column defining an exchange surface for at least one liquid phase which intimately contacts at least one gaseous phase. The packing comprises a stack of plates provided with triangular undulations, each plate being contained between two parallel planes at a distance of a value between 5 and 50 mm. These undulations form a series of channels provided with wings contained between the two parallel planes. Each of the plates has at least one strip stamped in one of the plates with the width of the strip being between 2 and 20 mm. The strip is fixed to the plate by its two ends and the strip is formed in a triangle to obtain a more or less triangular form with respect to a central plane of the two planes and in such a way as to create an orifice forming a discontinuity on the surface of the plate.

The total surface of the wings can make up between 20% and 50% of the total surface of the plates of the structured packing.

The direction of the channels of a plate can form an angle between 20° and 90° with respect to the direction (D) of the channels of an adjacent plate.

Each wing can have an apex at a distance of at least 2 mm from the two plates.

Each end of the strip forms an angle of between 85° and 95° with the plate.

The wings which are distributed along a channel can have different shapes.

The strip can have an elongated shape whose principal direction is oriented along an angle more or less than 90° with respect to the direction of the channels.

The plates can be made of at least one of the materials selected among metallic materials and thermoplastic polymer materials.

The invention also relates to a fluid exchange column comprising a plurality of blocks comprising structured packing in which the direction of the channels of the packings is oriented according to an angle of between 10° and 75° with respect to the axis of the column and in which the central planes of the structured packing of one of the blocks form an angle of between 20° and 90° with respect to the central planes of the adjacent blocks.

The contact column according can be applied to the deacidification of a natural gas, the decarbonation of flue gas or to tail gas treatment downstream from a Claus process.

The invention also relates to a fabrication method for a structured packing of a fluid exchange column, involving the following steps:
 a) stamping a plate made of deformable materials;
 b) bending the plate so as to form triangular undulations contained between two parallel plates (L1, L2) at a distance of a value between 5 and 50 mm, the undulations forming a series of channels;

c) stamping at least one strip in the plate, the width of the strip (B) being between 2 and 20 mm and the strip is fixed to the plate by its two ends (E1, E2);

d) deforming the strip (B) to create a wing forming an orifice providing a discontinuity of the plate surface and to obtain a triangular shape symmetrical to an initial form with respect to a central plane of the two planes (L1, L2), the deformed strip (B) being contained between the two parallel planes (L1, L2);

e) repeating steps c) and d) to form a number of wings on a plate;

f) stacking plates obtained from steps a) through e) to obtain an orderly assembly of plates;

g) machining the orderly assembly to form a structured packing block (B1-B4) conforming to the internal dimensions of the column.

The packing structures according to the invention permit an increase in capacity to pass larger flows, gas or liquid or two fluids in the contact column. This increase in capacity can be used for revamps to increase operating flow of the function of the existing contact columns by replacing the internal packings of these columns with new packings according to the invention. This makes it possible to avoid having to construct a new column. In the case of new installations, the packings according to the invention make it possible to decrease the diameter of the contact columns and/or to decrease the height of the packing and, therefore, the size of the column. In both cases, the goal is to achieve a reduction in investment costs.

Further, the packing structures according to the invention, allow an increase in efficiency, that is, maximizing the area by unit volume actually available for gas/liquid contact. The increase in efficiency makes it possible to decrease the height of the packing necessary for a given performance level and therefore an increase in the size of the contact column.

In addition, the increased capacity of the packings according to the invention can also have an impact on operating costs. In fact, in certain applications, such as the reactive absorption done particularly for the desacidification of Claus treatment tail gas, the proper operation of the contact column is guaranteed by a minimum liquid flow value per surface unit. The use of the structured packings of the invention permit, for a given gas flow, a reduction of the diameter of the column. Maintaining a constant liquid flow per surface unit makes possible decreasing the total liquid flow. Consequently, the operating costs associated with the circulation of the liquid are lowered.

BRIEF DESCRIPTION OF THE DRAWINGS

Other characteristics and advantages of the invention will be more fully understood and will appear clearly after reading the following description referring to the drawings, including.

Figure 2:
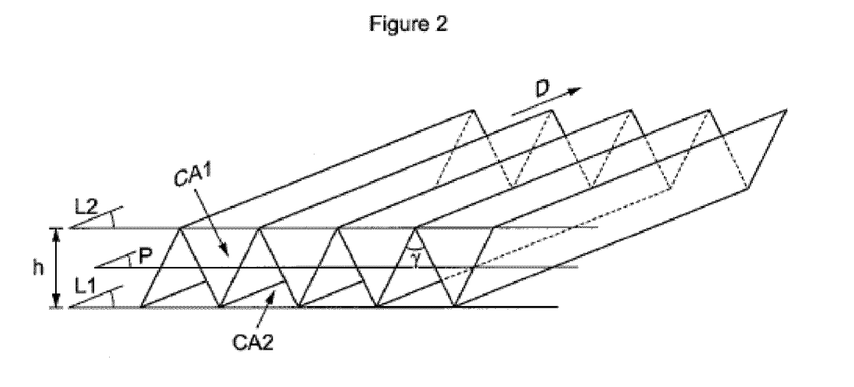
FIG. 2 is a schematic representation of a plate with triangular undulations.

FIG. 2 represents a sheet or undulated plate of the base of the structured packing according to the invention. These undulations are framed between two relatively close parallel planes L1 and L2. The distance h separating L1 from L2 can be between 5 mm and 50 mm, preferably greater than 7 mm, and most preferably between 7 mm and 20 mm. The central plane P divides the space between L1 and L2 into two equal parts. In FIG. 2, the undulations are in the form of triangles and are distributed on both sides of the central plane P: one part of the undulations is located on one side of the plane P and the other part of the undulations is located on the other side of the plane P. Preferably, apexes of the triangles form an angle γ between 85° and 95°. The undulations form a series of channels which extend in the direction indicated by the arrow D. The channel CA1 is located above the plane P. The channel CA2, which is contiguous to the channel CA1, is located below the plane P. Preferably, undulations are chosen that generate/create channels which touch or contact the planes L1 and L2 without crossing the space defined by the section of plane defined by planes L1 and L2. Thus, the undulated sheets occupy a maximum surface in the section of plane defined by the planes L1 and L2.

The undulated sheets can be obtained by cold or hot stamping, by bending or by hot forming of a flat sheet. The undulated sheets can also be obtained by extrusion using a die.

Preferably, the undulated sheets are made of metal, for example, steel, because steel is a material with good mechanical stability and which is available at a low price. However, it is also possible to realize the undulated sheets in polymer, thermoplastic or thermosetting materials which may be optionally reinforced with glass, carbon or aramid fibers.

Plates can be used with a smooth surface. It is also possible to use plates with an embossed surface, that is, a surface which has roughness whose largest dimension is less than 3 mm, that is 1 mm.

Figure 3:
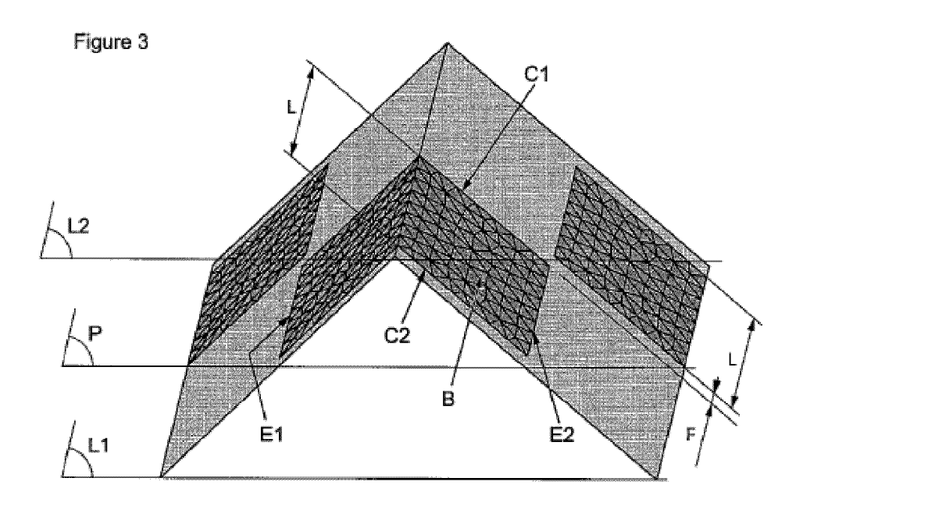
FIG. 3 shows a cut-away strip in a channel of an undulated plate.

According to the invention, the undulated sheets are modified to form the wings which create surface discontinuities on the sheets. FIG. 3 represents a portion of a channel of an undulated plate. A strip B is stamped according to the grooves C1 and C2. The strip B is fixed to the plate at its ends E1 and E2.

In FIG. 3, the strip B is located below the central plane P. The strip B can have different shapes, for example, rectangular or trapezoidal. According to the invention, the strip B has been deformed to create a discontinuity on the surface of the sheet at the level of the grooves C1 and C2. Each discontinuity provides an opening in the undulated plate. The fact that the wing is continuous and fixed by its two ends E1 and E2 to the undulated plate makes it possible to minimize the possibility of creating bridges due to capillary effect, where liquid would not be renewed.

Figure 4A:
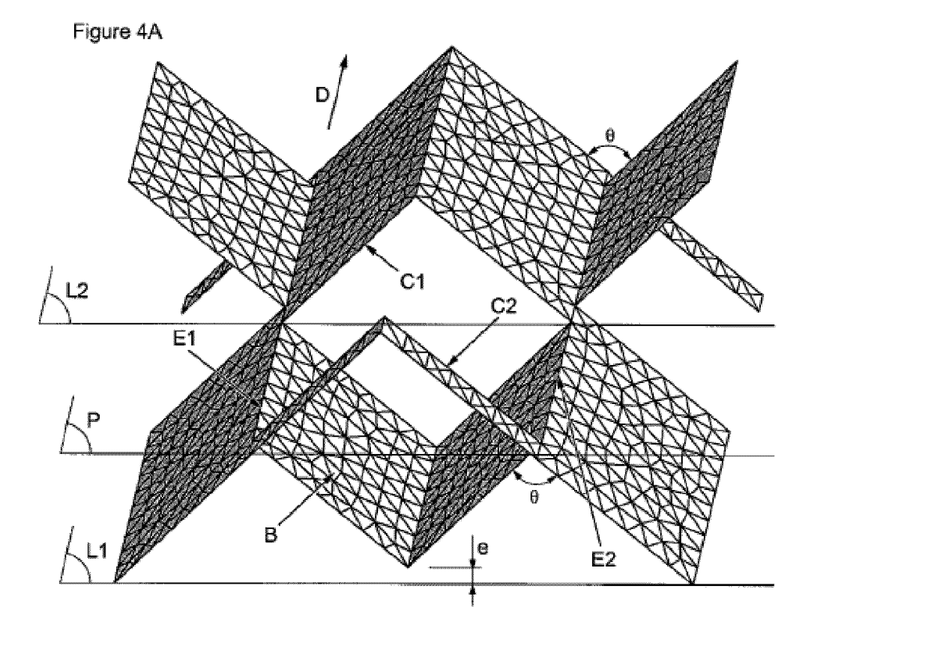
FIGS. 4A and 4B represent channels provided with wings with different shapes.
Figure 4B:
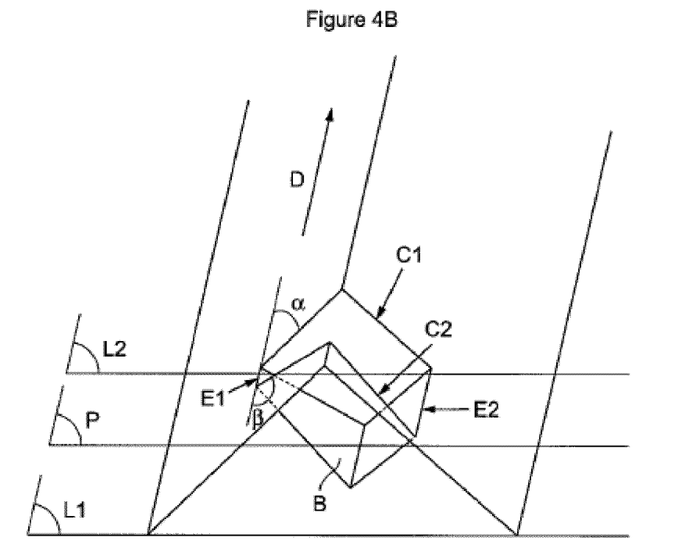

FIGS. 4A and 4B represent a strip B that has been deformed. The deformation is limited by the fact that the strip does not exceed the space located between the planes L1 and L2. In that way the undulated sheet only occupies the available space between these two planes L1 and L2, and can easily be stacked on another undulated sheet having the same characteristics. The strip B is deformed in such a way that it is positioned above the plane P, in the positions illustrated in FIGS. 4A and 4B. In other words, the strip B is deformed in such a way that at least one part of the strip crosses the plane P. After deformation, the strip B is located on the side of the plane opposite to the side where the strip B was positioned in its initial position. The wing, which is a deformed strip, is located at least in part on the opposite side, with respect to the plane P to the position of the channel in which the strip was embossed. In that way, the wings occupy the free space in the channels formed by the undulations and increase the surface of the packing which is actually usable for the exchange of fluids. The FIGS. 4A and 4B illustrate a strip B deformed into a triangular form which is symmetrical to its initial form relative to the central plane P.

Preferably, the apexes of the triangles formed by the wings do not touch the planes L1 and L2 in order to minimize the contact points between two adjacent plates. The apexes can be at a distance from 2 mm to 4 mm, from planes L1 and L2.

In the plane perpendicular to the direction D of the channels, at the level of the fasteners E1 and E2 of the wings, the surface of the wing forms an angle θ with the plate. According to the invention, the angle θ is between 85° and 95°. In general θ is about 90°.

Preferably, the surface of the wings has a direction parallel to the direction D of the channels. In that way, the wings do not obstruct or they minimally block the flow of the fluids in the channels of the undulated plates. This fact plays a role in minimizing the head loss of fluids flowing through a structured packing comprising these plates.

The undulated sheet having wings according to the invention develops the same specific geometric area as the same undulated sheet without a wing because there is no material shrinkage when the wings are created. In that way, a structured packing according to the invention has the same geometric area as a standard structured packing. The presence of the wings in the structured packings of the invention forces the liquid film flowing to the surfaces of the channels to flow in the form of drops at the level of the surface breaks created by the presence of the wings. Thus, the wings according to the invention maximize the surface useful for contact between the gas and the liquid circulating in the structured packing.

Further, the wings guarantee proper agitation of the gas flow, which promotes the mass transfer between the gas and the liquid which are contacted in the structured packing of the invention. To promote agitation, the form of one wing is different from that of the adjacent wings along the same channel. The alternation of the shapes of the wings along the channel plays an active role in agitating the flow and in mixing the circulation phases along the channel.

In order to actually create a breakage of the liquid film, the grooves allowing the formation of wings are oriented in an angle between 20° and 90° with respect to the direction D of the channels. Preferably, the wings form a strip whose edges form an angle substantially equal to 90°, as illustrated in FIG. 4A. These grooves can be substantially parallel. With reference to FIG. 4B, the strip B has been embossed in a plate according to two grooves C1 and C2 which are not parallel. The groove C1 forms an angle α which is 90° with respect to the direction D of the channel. The groove C2 forms an angle β which is 70° with respect to the direction D of the channel.

In order for the wings to fully provide their function, the width L of the strips B is greater than 2 mm and preferably is greater than 4 mm, in order to avoid capillary effects which will close the orifices formed on the surface of the channels by the deformed strips B. In order to promote flow in the form of liquid film on the surface of the channels and a flow in the form of drops in the space left free by the deformed strips, it can be provided that the width of the strips B is less than 20 mm and preferably less than 15 mm. The undulated plate has a minimum space between the wings. Preferably, a space A of between 0 and 5 mm is between two wings with space A being measured in the direction of the channels. The total surface of the wings, that is, the surface of the strips B embossed in the undulated sheets can be greater than 20%, and preferably is less than 50% of the total surface of the sheet, in order to obtain good performance. An excellent value of the total surface of the wings is between 40% and 50% of the total surface of the plate.

Figure 5:
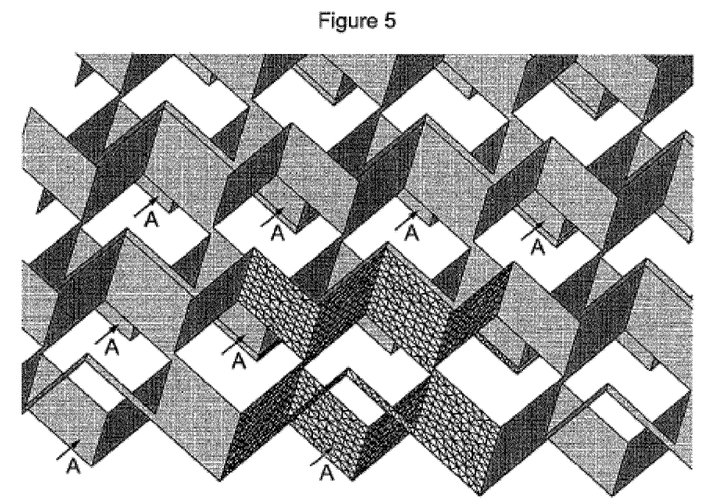
FIG. 5 is a schematic drawing of an undulated plate provided with triangular wings.

FIG. 5 gives an example of an undulated sheet provided with a plurality of wings A comprising a triangular profile, similar to those described in FIG. 4A. On an undulated sheet, the wings can be identical in order to optimize and facilitate the manufacturing process.

Figure 6:
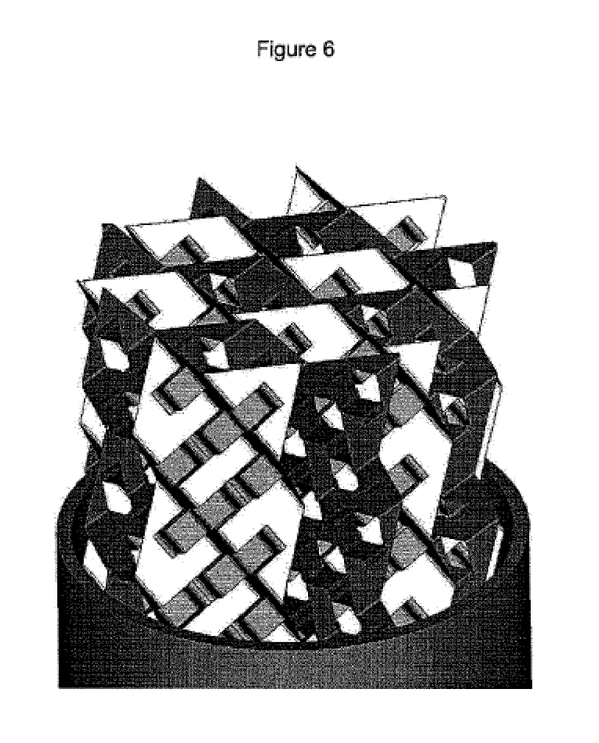
FIG. 6 is a schematic drawing of a structured packing.

The undulated sheets provided with wings are stacked to form a structured packing. Preferably, the direction of the channels of an undulated sheet is shifted with respect to the direction of the channels of the adjacent sheets, for example, by an angle between 20% and 90% and preferably is an angle having a value more or less close to 90%. FIG. 6 represents a structured packing comprising undulated sheets following a triangular motif.

Figure 7:
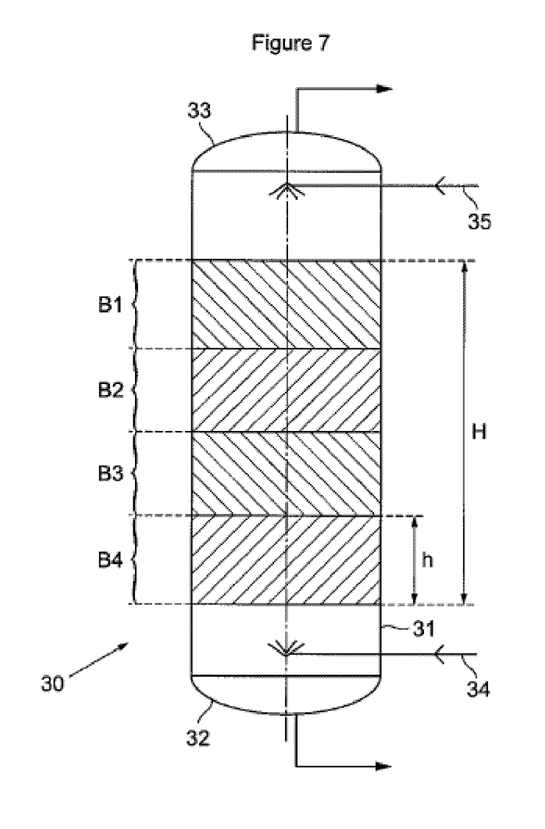
FIG. 7 is a schematic drawing of a contact column.
Figure 8:
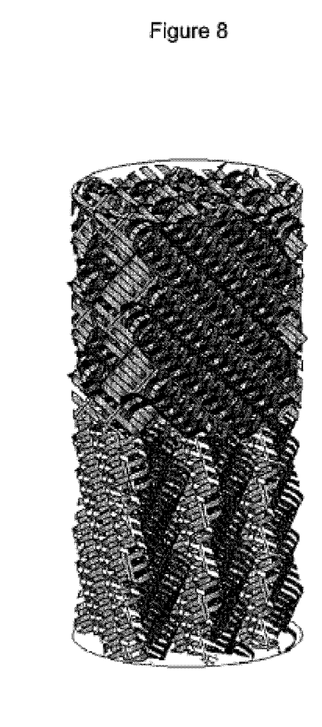
FIG. 8 represents an assembly of structured packings.

FIG. 7 illustrates a contact column 30 comprising a cylindrical enclosure 31 closed by base pieces 32 and 33. A fluid, for example gas, is introduced to the base of the column by the duct 34. Another fluid, for example a liquid, is introduced to the top of the column by the duct 35. These two fluids come into contact with the space located between the feeds of the column by ducts 34 and 35. In order to improve the contact and to promote mass or heat transfer, the column 30 is provided with an internal packing at the height H which can reach several dozen meters. According to the invention, the structured packing is comprised of undulated sheets equipped with wings, for example described with reference to FIG. 5 and disposed, for example, according to an arrangement described with reference to FIG. 6. Preferably, according to the invention, a packing is used comprising blocks B1, B2, B3 and B4 in which the channels are oriented differently from one block to the other. In general, the plates constituting the structured packings are arranged so that the direction of the channels formed by the undulations forms an angle between 10° and 75°, with respect to the vertical. An excellent value of this angle is between 20° and 45°. In addition, the plates of a block are offset with respect to the adjacent blocks. In general, the center planes of the plates of a block form an angle between 20° and 90° which is frequently equal to 90°, with respect to the center planes of the plates comprising an adjacent block. FIG. 8 represents two adjacent blocks formed from plates having triangular undulations. The lower structure packing block has plates offset 90° with respect to the plates of the upper structure packing block. Also, with reference to FIG. 7, the height h of a block can be limited to a limit value, for example between 50 and 500 mm, and preferably between 100 and 400 mm by introducing blocks in the cylindrical enclosure during the assembly of the column. This alternation of orientation of the channels of the different blocks, associated with a limited height for each block, makes it possible to permanently redistribute the liquid by avoiding preferring one direction of flow. Thus, it is possible to avoid concentrating the liquid on the internal wall of the enclosure 31, which will cause a decrease in the contact area.

The packing according to the invention can be used for the deacidification of natural gas, the decarbonation of flue gas and for the treatment of Claus tail gas. In these applications, the gas to be treated is placed in contact with a liquid absorbent solution in a contact column equipped with a packing according to the invention.

The numeric example below makes it possible to compare a structured packing according to the invention compared to the structured packings and to the random packings of the prior art.

The packings are used in a deacidification process for a gas containing 10% by volume of $CO_2$. The gas to be treated having a flow of 350,000 Nm$^3$/h is placed in contact with an aqueous solution of amines in a column containing an internal packing. The absorption column is designed in such a way to be able to absorb 90% of $CO_2$. The results obtained by a column equipped with a structured packing according to the invention, a column equipped with a structured packing according to the prior art (MELLAPAK 250.Y packing marketed by the company Sulzer-Chemtech) and a column equipped with a random packing according to the prior art (IMTP50 packing marketed by the company Koch Glitsch) are compared. The three packings are chosen so as to offer the same hydraulic capacity. In that way, an identical column diameter for the three packings can be set. In this case, only the height of the packing in the column plays a role in the performance of the contact column The height of the packing necessary for each of the three cases to absorb 90% of $CO_2$ contained in the gas is calculated. The results are shown in

TABLE 1

| | ag (m$^2$/m$^3$) | ae (m$^2$/m$^3$) | ae/ag | height (m) |
|---|---|---|---|---|
| Random packing (prior art) | 120 | 212.4 | 1.77 | 26.2 |
| Structured packing (prior art) | 250 | 230 | 0.92 | 24.2 |
| Structured packing according to the invention | 180 | 270 | 1.5 | 20.6 |

It is observed that the replacement of current packings by the packings according to the invention allows a volume decrease of 15% compared to the case of the structured packing, and down to 21% compared to the case of the random packing.

The invention claimed is:

1. A structured packing of a fluid exchange column defining an exchange surface for at least one liquid phase to be placed in intimate contact with at least one ascending gaseous phase, comprising a stack of plates including triangular undulations, each plate being contained between two parallel planes at a distance of between 5 and 50 mm, the triangular undulations forming a series of continuous and triangular channels including wings projecting from the continuous and triangular undulations contained between the two parallel planes, each of the wings, being composed of a strip fabricated in one of the channels, a width of each strip being between 2 and 20 mm, each strip being fixed to the plate by two ends thereof and each strip being triangular in shape to provide a triangular form symmetrical relative to an initial form prior to fabrication thereof with respect to a central plane of the two parallel planes to create an orifice forming a discontinuity on a surface of each plate.

2. A packing according to claim 1, wherein a total surface of the wings comprises between 20% and 50% of a total surface of the plates.

3. A packing according to claim 1, wherein a direction of the channels of each plate forms an angle between 20° and 90° with respect to a direction of the channels of an adjacent plate.

4. A packing according to claim 2, wherein a direction of the channels of each plate forms an angle between 20° and 90° with respect to a direction of the channels of an adjacent plate.

5. A packing according to claim 1, wherein each wing has an apex at a distance of at least 2 mm from the two parallel planes.

6. A packing according to claim 2, wherein each wing has an apex at a distance of at least 2 mm from the two parallel planes.

7. A packing according to claim 3, wherein each wing has an apex at a distance of at least 2 mm from the two parallel planes.

8. A packing according to claim 4, wherein each wing has an apex at a distance of at least 2 mm from the two parallel planes.

9. A packing according to claim 1, wherein each end of each strip forms an angle of between 85° and 95° with the plate containing the strips.

10. A packing according to claim 2, wherein each end of each strip forms an angle of between 85° and 95° with the plate containing the strips.

11. A packing according to claim 3, wherein each end of each strip forms an angle of between 85° and 95° with the plate containing the strips.

12. A packing according to claim 4, wherein each end of each strip forms an angle of between 85° and 95° with the plate containing the strips.

13. A packing according to claim 5, wherein each end of each strip forms an angle of between 85° and 95° with the plate containing the strips.

14. A packing according to claim 6, wherein each end of each strip forms an angle of between 85° and 95° with the plate containing the strips.

15. A packing according to claim 7, wherein each end of each strip forms an angle of between 85° and 95° with the plate containing the strips.

16. A packing according to claim 8, wherein each end of each strip forms an angle of between 85° and 95° with the plate containing the strips.

17. A packing according to claim 1, wherein wings along a channel have different shapes.

18. A packing according to claim 1, wherein the strip is elongated along a principal direction oriented at an angle substantially equal to 90° with respect to a direction of the channels.

19. A packing according to claim 4, wherein the strip is elongated with a principal direction oriented at an angle substantially equal to 90° with respect to a direction of the channels.

20. A packing according to claim 1, wherein the plates comprise at least one of metal, thermoplastic and thermosetting polymer materials.

21. A packing exchange column including a plurality of blocks comprising a structured packing according to claim 1.

22. A use of a column according to claim 21 comprising one of basifying natural gas, decarbonating smoke or treating gas with a Claus process.

* * * * *